(12) United States Patent
Schmidt et al.

(10) Patent No.: US 10,882,731 B2
(45) Date of Patent: Jan. 5, 2021

(54) HANDLING SYSTEM FOR A FILLING SYSTEM FOR FILLING CONTAINERS AND CIRCUITS OF VEHICLES WITH DIFFERENT OPERATING MATERIALS ON ASSEMBLY LINES OF THE AUTOMOBILE INDUSTRY

(71) Applicant: DÜRR SOMAC GmbH, Stollberg (DE)

(72) Inventors: Karlheinz Schmidt, Schneeberg (DE); Katja Heilmann, Lichtenstein (DE); Marcus Weigelt, Hohenstein-Ernstthal (DE)

(73) Assignee: DÜRR SOMAC GmbH, Stollberg (DE)

( * ) Notice: Subject to any disclaimer, the term of this patent is extended or adjusted under 35 U.S.C. 154(b) by 33 days.

(21) Appl. No.: 16/326,255

(22) PCT Filed: Jul. 26, 2017

(86) PCT No.: PCT/DE2017/000234
§ 371 (c)(1),
(2) Date: Feb. 18, 2019

(87) PCT Pub. No.: WO2018/033167
PCT Pub. Date: Feb. 22, 2018

(65) Prior Publication Data
US 2019/0210863 A1 Jul. 11, 2019

(30) Foreign Application Priority Data
Aug. 19, 2016 (DE) .................. 10 2016 010 179

(51) Int. Cl.
B67D 7/02 (2010.01)
G05B 19/418 (2006.01)
(Continued)

(52) U.S. Cl.
CPC .............. *B67D 7/0288* (2013.01); *B67D 7/04* (2013.01); *B67D 7/0401* (2013.01); *B67D 7/403* (2013.01);
(Continued)

(58) Field of Classification Search
CPC .... B67D 2007/0403; B67D 2007/0432; B67D 2007/0436; B67D 2007/0459;
(Continued)

(56) References Cited

U.S. PATENT DOCUMENTS 4,781,517 A * 11/1988 Pearce .................... B23P 19/04
104/167
5,634,503 A * 6/1997 Musil ................... B67D 7/0401
137/234.6
(Continued)

FOREIGN PATENT DOCUMENTS

DE 69604489 T2 4/2000
DE 202008001415 U1 6/2009
(Continued)

OTHER PUBLICATIONS

International Search Report (in English and German) and Written Opinion (in German) issued in PCT/DE2017/000234, dated Dec. 22, 2017; ISA/EP.

*Primary Examiner* — Timothy L Maust
(74) *Attorney, Agent, or Firm* — Harness, Dickey & Pierce, P.L.C.

(57) ABSTRACT

A handling system for a filling system for filling containers and circuits of vehicles with different operating materials on assembly lines of the automobile industry is disclosed. The filling system has a base unit, a controller, a console, and an adapter. The adapter is operatively connected to a hose packet for supplying the respective operating materials which is movably supported on the console. The handling
(Continued)

system handles the hose packets which are operated with a medium other than a pneumatic system. The drive of the movable hose packets and the drive system of a lifting unit equipped with a tray for the adapter are each designed as an electromotive drive. The disclosure further provides the sequences of movement of the adapter and lifting unit.

4 Claims, 3 Drawing Sheets

(51) Int. Cl.
  *B67D 7/04* (2010.01)
  *B67D 7/40* (2010.01)
(52) U.S. Cl.
  CPC .......... *G05B 19/4189* (2013.01); *Y02P 80/10* (2015.11); *Y02P 90/02* (2015.11)
(58) Field of Classification Search
  CPC .............. B67D 2007/0469; B67D 7/04; B67D 7/0401; B67D 7/403; B67D 7/0288; G05B 19/4189
  See application file for complete search history.

(56) References Cited

U.S. PATENT DOCUMENTS

| | | | | |
|---|---|---|---|---|
| 6,226,848 | B1* | 5/2001 | Kurtz | B23P 21/004 |
| | | | | 29/407.01 |
| 6,237,647 | B1* | 5/2001 | Pong | B67D 7/0401 |
| | | | | 141/231 |
| 9,469,263 | B2* | 10/2016 | MacArthur | B60R 17/00 |
| 10,118,815 | B2* | 11/2018 | Achatz | B67D 7/005 |
| 2003/0164200 | A1* | 9/2003 | Czeranna | B67D 7/0401 |
| | | | | 141/1 |

FOREIGN PATENT DOCUMENTS

| | | |
|---|---|---|
| DE | 102009020312 A1 | 11/2010 |
| DE | 102012008378 A1 | 10/2013 |

* cited by examiner

HANDLING SYSTEM FOR A FILLING SYSTEM FOR FILLING CONTAINERS AND CIRCUITS OF VEHICLES WITH DIFFERENT OPERATING MATERIALS ON ASSEMBLY LINES OF THE AUTOMOBILE INDUSTRY

CROSS-REFERENCE TO RELATED APPLICATIONS

This application is a 371 U.S. National Stage of International Application No. PCT/DE2017/000234, filed on Jul. 26, 2017, which claims the benefit of German Patent Application No. 10 2016 010 179.2, filed on Aug. 19, 2016. The entire disclosures of the above applications are incorporated herein by reference.

FIELD

The invention relates to a filling system for filling containers and circuits of vehicles with different operating materials on assembly lines of the automobile industry.

BACKGROUND

This section provides background information related to the present disclosure which is not necessarily prior art.

In the automobile industry, vehicles must be filled in the manufacturing process with multiple different media, for example with fuel, lubricants, coolants, and other operating materials. These media are fed into the respective circuits of the vehicles on the assembly lines through predominantly automated processes using filling systems. The filling systems substantially consist of base unit, controller, console, and adapter, wherein the adapter is operatively connected to the hoses for supplying the respective media. The hoses mostly contain multiple lines with different functions for applying a vacuum, back-syphoning, filling, venting, as well as electric lines, which results in hose packets.

For filling, a worker must first take the adapters with the hose packets to the vehicles, depending on the position of the filling system, and connect them there to the circuits to be filled. During the subsequent filling, the filling system travels along with the vehicle to be filled, wherein the filling system moves at about the same speed as the assembly line. The basic principle of an assembly line equipped accordingly is for example known from U.S. Pat. No. 2,003,016 4200 A1.

Such assembly lines typically comprise multiple filling systems in one section. This allows correct filling of the vehicles within time units depending on cycle speed within just one section of the assembly line. To ensure good handling of the filling equipment by the worker, the movement sequences of the hoses or hose packets must be coordinated. Particularly, multiple filling systems must be prevented from interfering with each other. A typical situation in this respect can occur if a filling system is in operation that is arranged more outwardly relative to the longitudinal direction of the assembly line, and a filling system arranged more inwardly travels back to its initial position. During this movement, it may travel through an area where the hose packets of the outer filling system currently engaged are deployed. But several technical solutions are already known which are intended to prevent such problems and facilitate interference-free filling.

Fundamental potential solutions for multiple hoses, cables and the like moving separately in a common installation space are known from DE 20 2008 001 415 U1. A drive unit for moving these components has a detachable configuration using drivers and coupling members, thereby avoiding that movements intersect at defined critical operating points.

DE 10 2012 008 378 A1 describes a device for handling hose packets at filling systems, which picks up at least one hose in a loop longitudinally with respect to the direction of travel of the filling system and comprises an installation space in which a length of hose can be stored corresponding to at least twice the overall length of the filling system. Multiple hose packets can be arranged one behind the other in this installation space, wherein each of these hose packets can be moved separately from other hose packets.

The solutions mentioned above and numerous other technical solutions in principle proved suitable for performing a filling of the vehicles on assembly lines. Current demands for shorter cycle times, however, increasingly lead to problems, which are apparently caused by the so far common pneumatic operation of hose handling. Fast and very precise positioning is difficult using pneumatics as the working medium. Other disadvantages include an occurring breakaway torque during application and the fact that primarily one (single) pressure is available for operating various hose packets.

SUMMARY

This section provides a general summary of the disclosure, and is not a comprehensive disclosure of its full scope or all of its features.

The invention relates to a filling system for filling containers and circuits of vehicles with different operating materials on assembly lines of the automobile industry, wherein the filling system comprises, as its essential assemblies, a base unit, a controller, a console, and an adapter, wherein the adapter is operatively connected to multiple hoses for supplying the respective operating materials, which hoses are structurally combined in a hose packet and movably supported on the console.

It is the problem of the invention to provide a technical solution for handling hose packets or hose cassettes at filling systems which is operated by a medium other than a pneumatic system and thus overcomes the disadvantages occurring inevitably as a result of pneumatic operation.

This problem is solved in that the drive system of the movable hose packets and the drive system of a lifting unit equipped with a tray for the adapter are each designed as an electromotive drive. The principal approach to the solution therefore is the consideration to operate the hose rewind and the lifting axis electrically. This means that problems resulting from the as yet common pneumatic operation of hose handling systems (inaccurate positioning, breakaway torque, just one pressure for different hose cassettes) are therefore not relevant.

The use according to the invention of electromotive components rather than pneumatic components however requires a modification of the control characteristics of the sequences of movement if the adapter and lifting unit.

We propose in this respect to preset the own parking position of the lifting unit as the target position for the movement of the lifting unit from its working position to its parking position. At the same time, the adapter delivery unit is assigned an indirect target position based on the current position of the lifting unit. The lifting unit is rated the MASTER unit, which dynamically presets the position of the adapter delivery unit. This position is calculated using a formula $$Pos_{AZ} = \frac{Pos_{HE1} - Anf_{HE1} + \ldots + Pos_{HEn} - Anf_{HEn}}{End_{HE1} - Anf_{HE1} + \ldots + End_{HEn} - Anf_{HEn}} * (End_{AZ} - Anf_{AZ}) + Anf_{AZ}$$

We further propose to preset the own working position of the adapter delivery unit as the target position for the movement of the adapter delivery unit from its parking position to its working position. At the same time, the lifting unit is assigned an indirect target position based on the current position of the adapter delivery unit. The adapter delivery unit is rated the MASTER unit, which dynamically presets the position of the lifting unit. These positions are calculated using the formulas $$Pos_{HE1} = \frac{(Pos_{Az} = Anf_{AZ}) * (End_{HE1} - Anf_{HE1})}{End_{AZ} - Anf_{AZ}} + Anf_{HE1}$$

$$\vdots$$

$$Pos_{HEx} = \frac{(Pos_{AZ} - Anf_{AZ}) * (End_{HEx} - Anf_{HEx})}{End_{AZ} - Anf_{AZ}} + Anf_{HEx}$$

Since the adapters are clamped into the console during the movements (travels) of the handling system, the different sequencing of the various axes provides an additional safety against adapters getting stuck or breaking away. The MASTER function is always performed by that axis that lets the axes become "looser".

The speeds of the relevant assemblies should also be coordinated for functionally optimal position assignments of each assembly.

We propose in this respect that the moving speed of the adapter delivery unit is calculated according to the following formula:

$$v_{AZ} = \frac{(End_{AZ} - Anf_{AZ}) * (v_{HE1} + \ldots + v_{HEn})}{End_{HE1} - Anf_{HE1} + \ldots + End_{HEn} - Anf_{HEn}}$$

We further propose that the moving speed of the lifting unit is calculated based on the following formulas:

$$v_{HE1} = v_{HEges} * \frac{End_{HE1} - Anf_{HE1}}{(End_{HE1} - Anf_{HE1} + \ldots + End_{HEn} - Anf_{HEn})}$$

$$\vdots$$

$$v_{HEx} = v_{HEges} * \frac{End_{HEx} - Anf_{HEx}}{(End_{HE1} - Anf_{HE1} + \ldots + End_{HEn} - Anf_{HEn})}$$

Wherein $v_{HEges} = v_{HE1} + \ldots + v_{HEn}$

The respective speed is preferably calculated in relation to the lifting axis. A moving speed typical for regular operating conditions of filling systems can be preset for the lifting axis, e.g. 15 m/min. The speeds of the various axes result from the different length ratios of the individual axes.

Apart from the advantages of the system-related exchange of pneumatically/electrically operated components, a major advantage of the proposed handling system is that an extended adapter delivery unit can be retracted at a point in time at which the entire system is moving upwards from the working area again to save time, that is, is moving towards the parking position.

When applying the handling system, the adapter delivery unit always travels to a central position with the lifting axes. The adapter is taken out from there to an end position to fill the vehicle. As soon as the adapter is stored again, the adapter delivery unit typically moves back to the central position. But if a respective adapter is the last adapter that has not been stored yet, the handling system travels upwards as soon as this adapter is stored.

The speeds of the handling system for UP and DOWN are considerably slower than the delivery speed (if an adapter is taken out) or the retracting speed (if an adapter is stored). Accordingly, the adapter stored last can always catch up with its dynamically preset target position during retraction of the handling system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The drawings show the basic structure of a handling system according to the invention, wherein.

DETAILED DESCRIPTION

Figure 1:
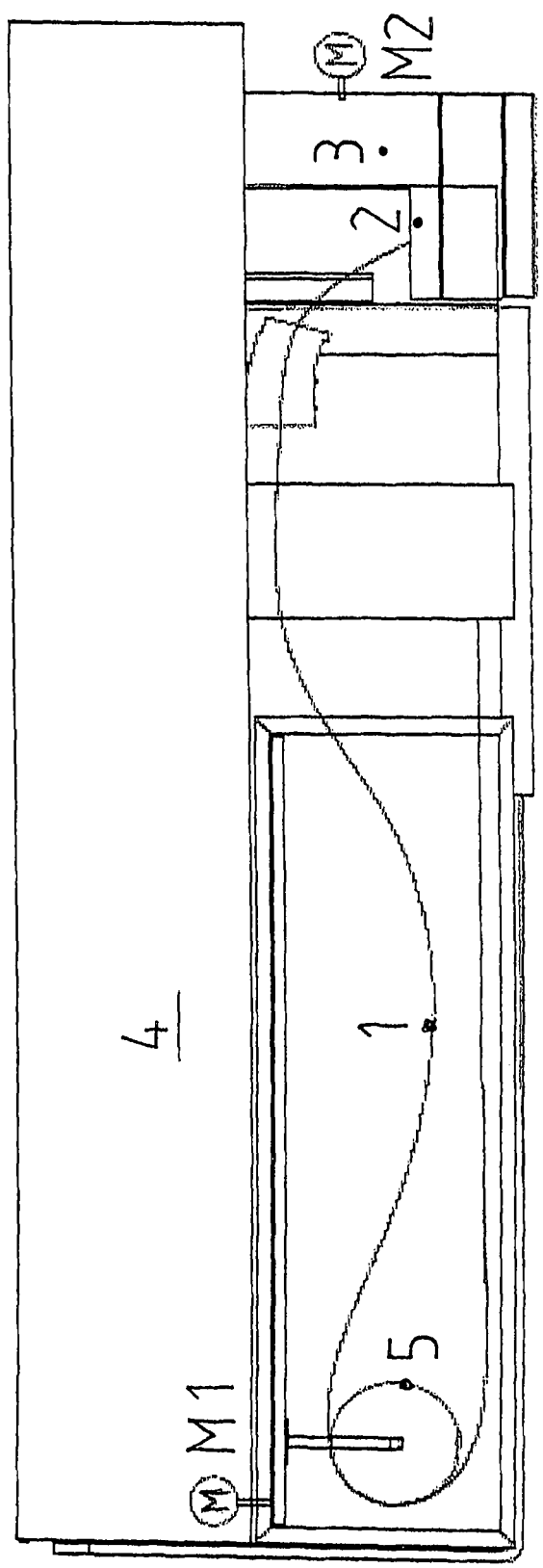
FIG. 1 shows a side view of the filling system in a first position, reduced to its essential components.

Example embodiments will now be described more fully with reference to the accompanying drawings.

The handling system is designed for a filling system for filling containers and circuits of vehicles with different operating materials on assembly lines of the automobile industry. The essential assemblies of the filling system are a base unit, a controller, a console, and an adapter, wherein the two elements mentioned first are not shown in detail in the drawing. The adapter is operatively connected to multiple hoses for supplying the respective operating materials, which hoses are structurally combined into a hose packet. This hose packet is arranged in a support frame and movably mounted to the console. Such a design is known and needs not be explained in detail herein.

However, it is essential in this respect that the drive of the movable hose packets 1 and the drive of a lifting unit 3 equipped with a tray 2 for the adapter is designed as an electromotive drive, which is identified with the reference symbol "M" here.

FIG. 1 shows the handling system in its parking position, that is, in a state at which no filling takes place. The hose packet 1, which is guided via deflection rollers 5, is stored in the console in the retracted state. The lifting unit 3 with the adapter tray 2 is also retracted.

Figure 2:
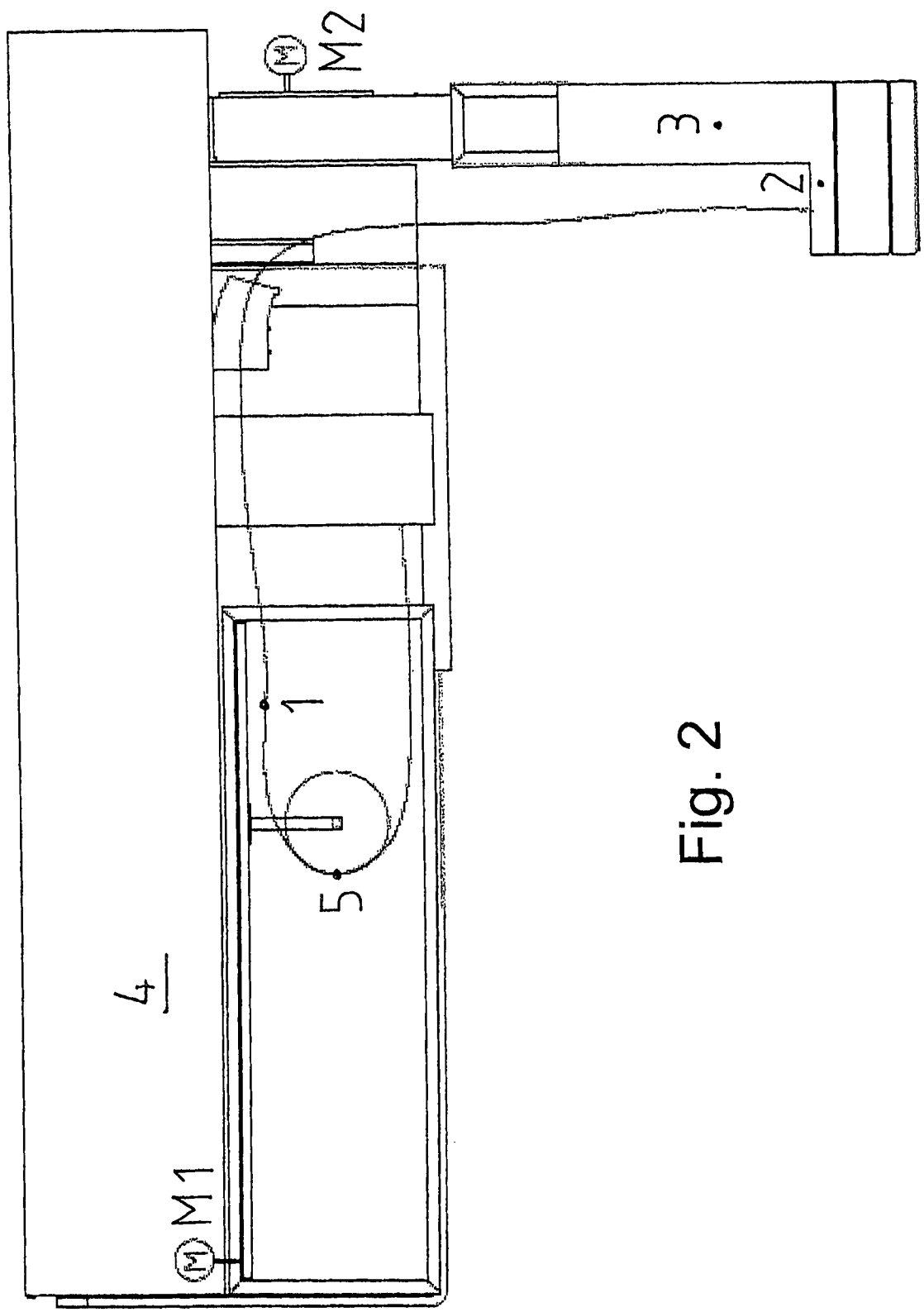
FIG. 2 shows the filling system illustrated in FIG. 1 in a second position.

FIG. 2 shows the handling system in its working position, that is, in a state at which filling is possible. The hose packet 1 is mounted to the console in a largely extended position. The deflection rollers 5 are shifted far to the right compared to FIG. 1, wherein this movement was triggered using the electromotive drive M1. At the same time, the lifting unit 3 with the adapter tray 2 is in a largely extended position and thus shifted far downwards compared to FIG. 1. This movement was triggered using the electromotive drive M2.

Figure 3:
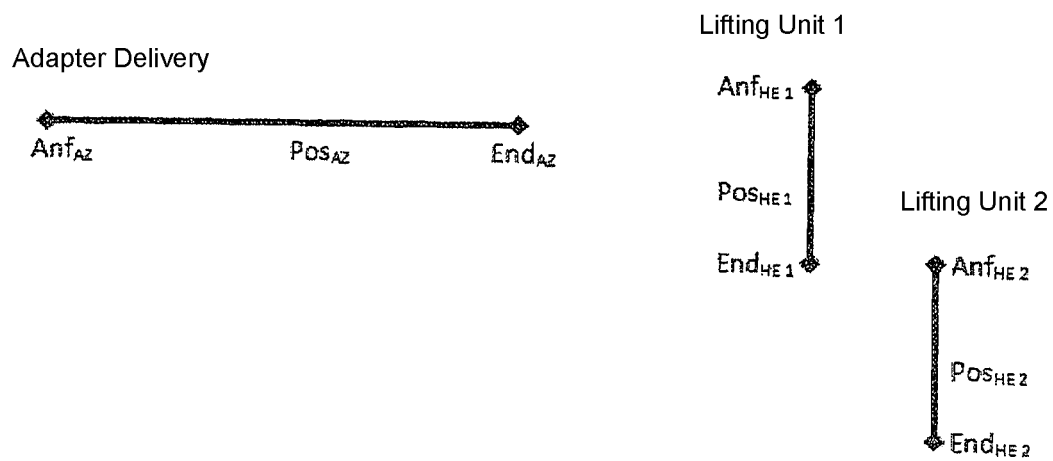
FIG. 3 shows a stylized representation of the movements of the adapter delivery unit and the lifting unit.
Figure 3:

FIG. 3 is a stylized representation of the movements of the adapter delivery unit and the lifting unit. Since the technical solution according to the invention is not only suitable for handling systems having just one lifting unit, FIG. 3 shows a variant having, for example, two lifting units HE1 and HE2. Typical points in the sequence of movements (Anf/Pos/End, etc.) are marked on the three axes, which points are taken into account in the formulas for specifying the position and/or speed explained above. Where these formulas are applied to this actual embodiment, the following connection results:

The target position for moving from the working position to the parking position is preset for each lifting unit HE1 and HE2 as their respective own parking position $Anf_{HE1}$ and $Anf_{HE2}$, respectively. At the same time, the adapter delivery unit AZ is assigned an indirect target position based on the current position of the lifting units HE1 and HE2. The entire lifting unit HE1 and HE2 is rated MASTER, which dynamically presets the position of the adapter delivery unit AZ according to the position formula $$Pos_{AZ} = \left( \frac{Pos_{HE1} - Anf_{HE1} + Pos_{HE2} - Anf_{HE2}}{End_{HE1} - Anf_{HE1} + End_{HE2} - Anf_{HE2}} \right) * (End_{AZ} - Anf_{AZ}) + Anf_{AZ}$$

Furthermore, the target position preset for the movement from the parking position to the working position of each adapter delivery unit AZ is its own working position $End_{AZ}$. At the same time, each lifting unit HE1 and HE2 is assigned an indirect target position based on the current position of the adapter delivery unit AZ. The adapter delivery unit AZ is rated MASTER, which dynamically presets the position of the lifting units HE1 and HE2 according to the position formulas $$Pos_{HE1} = \frac{(Pos_{Az} - Anf_{AZ}) * (End_{HE1} - Anf_{HE1})}{End_{AZ} - Anf_{AZ}} + Anf_{HE1}$$

$$Pos_{HE2} = \frac{(Pos_{Az} - Anf_{AZ}) * (End_{HE2} - Anf_{HE2})}{End_{AZ} - Anf_{AZ}} + Anf_{HE2}$$

The moving speed of the adapter delivery unit AZ is calculated as $$v_{AZ} = \frac{(End_{AZ} - Anf_{AZ}) * (v_{HE1} + v_{HE2})}{(End_{HE1} - Anf_{HE1} + End_{HE2} - Anf_{HE2})}$$

The moving speed of the lifting units HE1 and HE2 is calculated as $$v_{HE1} = v_{HEges} * \frac{End_{HE1} - Anf_{HE1}}{(End_{HE1} - Anf_{HE1} + End_{HE2} - Anf_{HE2})}$$

$$v_{HE2} = v_{HEges} * \frac{End_{HE2} - Anf_{HE2}}{(End_{HE1} - Anf_{HE1} + End_{HE2} - Anf_{HE2})}$$

The foregoing description of the embodiment has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A handling system for a filling system for filling containers and circuits of vehicles with different operating materials on assembly lines of the automobile industry;
   wherein the filling system comprises a base unit, a controller, a console, and an adapter;
   wherein the adapter is operatively connected to a plurality of hoses for supplying respective different operating materials to each of the plurality of hoses, which hoses are structurally combined in a hose packet and movably supported on the console;
   wherein a drive system of the movable hose packet and a drive system of a lifting unit equipped with a tray for the adapter are each designed as an electromotive drive;
   wherein the handling system comprises at least one lifting unit, wherein a target position for moving from a working position to a parking position is preset for the lifting unit as its respective own parking position and an adapter delivery unit is assigned an indirect target position based on the current position of the lifting unit, wherein the lifting unit is rated MASTER and dynamically presets the position of the adapter delivery unit according to a position formula:

$$Pos_{AZ} = \frac{Pos_{HE1} - Anf_{HE1} + \ldots + Pos_{HEn} - Anf_{HEn}}{End_{HE1} - Anf_{HE1} + \ldots + End_{HEn} - Anf_{HEn}} * (End_{AZ} - Anf_{AZ}) + Anf_{AZ}.$$

2. The handling system according to claim 1 wherein the moving speed of the adapter delivery unit is calculated according to a formula:

$$v_{AZ} = \frac{(End_{AZ} - Anf_{AZ}) * (v_{HE1} + \ldots + v_{HEn})}{End_{HE1} - Anf_{HE1} + \ldots + End_{HEn} - Anf_{HEn}}.$$

3. The handling system according to claim 1 wherein the moving speed of the lifting unit is calculated according to a formula:

$$v_{HE1} = v_{HEges} * \frac{End_{HE1} - Anf_{HE1}}{(End_{HE1} - Anf_{HE1} + \ldots + End_{HEn} - Anf_{HEn})}$$

$$\vdots$$

$$v_{HEx} = v_{HEges} * \frac{End_{HEx} - Anf_{HEx}}{(End_{HE1} - Anf_{HE1} + \ldots + End_{HEn} - Anf_{HEn})}$$

wherein $v_{HEges} = v_{HE1} + \ldots + v_{HEn}$.

4. A handling system for a filling system for filling containers and circuits of vehicles with different operating materials on assembly lines of the automobile industry;
   wherein the filling system comprises a base unit, a controller, a console, and an adapter;

wherein the adapter is operatively connected to a plurality of hoses for supplying respective different operating materials to each of the plurality of hoses, which hoses are structurally combined in a hose packet and movably supported on the console;

wherein a drive system of the movable hose packet and a drive system of a lifting unit equipped with a tray for the adapter are each designed as an electromotive drive;

wherein the handling system comprises at least one lifting unit, wherein a target position for moving from a parking position to a working position is preset for an adapter delivery unit as its respective own working position and the lifting unit is assigned an indirect target position based on the current position of the adapter delivery unit, wherein the adapter delivery unit is rated MASTER and dynamically presets the position of the adapter lifting unit according to the position formulas:

$$Pos_{HE1} = \frac{(Pos_{AZ} - Anf_{AZ}) * (End_{HE1} - Anf_{HE1})}{End_{AZ} - Anf_{AZ}} + Anf_{HE1}$$

$$\vdots$$

$$Pos_{HEx} = \frac{(Pos_{AZ} - Anf_{AZ}) * (End_{HEx} - Anf_{HEx})}{End_{AZ} - Anf_{AZ}} + Anf_{HEx}.$$

* * * * *